United States Patent
Froeber et al.

[11] Patent Number: 5,991,594
[45] Date of Patent: Nov. 23, 1999

[54] ELECTRONIC BOOK

[76] Inventors: Helmut Froeber; Hong Kim, both of #12 Foxglove Way, Irvine, Calif. 92715

[21] Appl. No.: 08/897,893

[22] Filed: Jul. 21, 1997

[51] Int. Cl.⁶ ....................................................... G09B 5/00
[52] U.S. Cl. ..................... 434/317; 434/185; 434/307 R; 434/365; 345/901
[58] Field of Search ................................... 434/116, 118, 434/156, 169, 185, 307 R, 308, 317, 365; 345/145, 146, 157, 901; 704/1; 348/552; 707/201; 714/20; 706/927

[56] References Cited

U.S. PATENT DOCUMENTS

| | | |
|---|---|---|
| D. 359,306 | 6/1995 | Lande et al. . |
| 4,159,417 | 6/1979 | Rubincam . |
| 4,580,985 | 4/1986 | Redenbaugh ............................. 434/365 |
| 4,884,974 | 12/1989 | DeSmet . |
| 4,985,697 | 1/1991 | Boulton . |
| 5,233,333 | 8/1993 | Borsuk . |
| 5,339,091 | 8/1994 | Yamazaki et al. . |
| 5,413,486 | 5/1995 | Burrows et al. ......................... 434/317 |
| 5,477,510 | 12/1995 | Ukita ................................... 434/317 X |
| 5,695,345 | 12/1997 | Weiner et al. ........................... 434/317 |
| 5,697,793 | 12/1997 | Huffman et al. ......................... 434/317 |
| 5,710,922 | 1/1998 | Alley et al. .............................. 707/201 |
| 5,717,938 | 2/1998 | Garthwaite et al. ......................... 704/1 |
| 5,774,109 | 6/1998 | Winsky et al. ...................... 345/901 X |
| 5,847,698 | 12/1998 | Reavey et al. ...................... 345/901 X |
| 5,914,706 | 6/1999 | Kono .................................. 345/901 X |

*Primary Examiner*—Joe H. Cheng

[57] ABSTRACT

An electronic book is provided including a plurality of PCMIA cards each with read only memory having a unique text permanently stored therein. Further provided is a portable unit comprising at least one speaker for allowing the transmission of audio signals upon the receipt thereof, a PCMCIA interface slot formed in the housing for allowing the downloading of the text of the PCMCIA card, and a speech processor/synthesizer connected to the speaker for transmitting audio signals thereto upon the receipt of text stored in the PCMCIA card. Such audio signals are representative of speech corresponding with the text. Further provided is a control mechanism adapted to download the text located within the PCMCIA card via the PCMCIA interface and further transmit the same to the speakers and the display whereby the audio signals are continuously transmitted and a user may view the text via the display.

6 Claims, 3 Drawing Sheets

ELECTRONIC BOOK

BACKGROUND OF THE INVENTION

1. Field of the Invention

The present invention relates to laptop computers and more particularly pertains to a new electronic book for providing coincident visual and audible reading of electronically stored literature.

2. Description of the Prior Art

The use of laptop computers is known in the prior art. More specifically, laptop computers heretofore devised and utilized are known to consist basically of familiar, expected and obvious structural configurations, notwithstanding the myriad of designs encompassed by the crowded prior art which have been developed for the fulfillment of countless objectives and requirements.

Known prior art laptop computers include U.S. Pat. No. 5,339,091; U.S. Pat. No. 4,159,417; U.S. Pat. Des. 359,306; U.S. Pat. No. 4,884,974; U.S. Pat. No. 5,233,333; and U.S. Pat. No. 4,985,697.

In these respects, the electronic book according to the present invention substantially departs from the conventional concepts and designs of the prior art, and in so doing provides an apparatus primarily developed for the purpose of providing coincident visual and audible reading of electronically stored literature.

SUMMARY OF THE INVENTION

In view of the foregoing disadvantages inherent in the known types of laptop computers now present in the prior art, the present invention provides a new electronic book construction wherein the same can be utilized for providing coincident visual and audible reading of electronically stored literature.

The general purpose of the present invention, which will be described subsequently in greater detail, is to provide a new electronic book apparatus and method which has many of the advantages of the laptop computers mentioned heretofore and many novel features that result in a new electronic book which is not anticipated, rendered obvious, suggested, or even implied by any of the prior art laptop computers, either alone or in any combination thereof.

To attain this, the present invention generally comprises a plurality of PCMCIA cards. Each of such cards has read only memory with unique text permanently stored therein. Such text preferably takes the form of literature. Further included is non-volatile random access memory adapted to allow the temporary storage of a plurality of different flags located within the text stored in the read only memory. As shown in FIG. 2, a pair of headphones are provided with an inverted U-shaped headset. Situated at ends of the U-shaped headset is a pair of ear portions for transmitting audio signals therefrom upon the receipt thereof. As an option, the headphones have a volume toggle switch positioned on one of the ear portions for controlling a volume of the audio signals transmitted therefrom. Also included is a portable unit comprising a housing. The housing has a lower planar portion with a rectangular configuration and a top face and a bottom face. The housing further includes an upper planar portion with a rectangular configuration having a front face and a rear face. The upper planar portion is hingably coupled at an elongated edge thereof to a corresponding elongated edge of the lower planar portion. By such structure, the upper planar portion swivels between an open and closed orientation. For allowing the selective locking of the upper planar portion in the closed orientation thereof, a locking mechanism is positioned on the top face of the lower planar portion. Such locking mechanism is similar in design to those employed in the laptop computer art. Positioned on the front face of the upper planar portion of the housing is a liquid crystal display for depicting text upon the receipt thereof. A pair of speakers are positioned in a thin housing. Each is slidably situated within an associated slot formed in a short side edge of the upper planar portion of the housing. In use, the speakers are adapted for sliding between an extended and an inserted orientation. The speakers are further adapted for allowing the transmission of audio signals upon the receipt thereof. The pair of speakers further function to cease transmission of the audio signals and allow the transmission of the same to the ear portions of the headphones upon the coupling thereof to the housing. Also provided is a PCMCIA interface slot formed in a short side edge of the lower planar portion of the housing. The interface slot is adapted for allowing the downloading of the text and the different flags located within the text of the PCMIA card. A speech processor/synthesizer is situated within an interior space of the lower planar portion of the housing. The present component is connected to the speakers for transmitting audio signals thereto upon the receipt of text stored in the PCMCIA card. It should be noted that the audio signals are representative of speech corresponding with the text. A plurality of buttons are situated on the top face of the lower planar portion of the housing. The buttons include four cursor buttons and a page up button and page down button positioned to the side of the four cursor buttons. A goto button is positioned directly above the four cursor buttons. Further provided is a bookmark button positioned above the four cursor buttons. Finally, control means is connected to the PCMIA interface, liquid crystal display, speech processor/synthesizer, and the buttons. In operation, the control means is adapted to download the text and the different flags located within the text of the PCMIA card via the PCMIA interface. After downloading, the text and the different flags are transmitted to the speakers and the display, whereby the audio signals are continuously transmitted and a user is allowed to scroll freely through the text via moving of a cursor by way of the scroll buttons, page up button, and page down button. To allow a user to select where the audio signals begin, the control means is further adapted to allow transmission of audio signals representative of text where the cursor currently resides. It should be noted that this is effected upon the depression of the goto button. To resume reading and/or listening to a portion of the literature where one left off last, the control means also serves to automatically move the cursor to a location within the text dictated by one of the flags upon the depression of the bookmark button. Once the text appears on the display, the control means effects the transmission of audio signals representative of text where the cursor resides. When a user wishes to cease use of the present invention, the book mark may again be depressed to store a flag at a present location of the cursor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new electronic book apparatus and method which has many of the advantages of the laptop computers mentioned heretofore and many novel features that result in a new electronic book which is not anticipated, rendered obvious, suggested, or even implied by any of the prior art laptop computers, either alone or in any combination thereof.

It is another object of the present invention to provide a new electronic book which may be easily and efficiently manufactured and marketed.

It is a further object of the present invention to provide a new electronic book which is of a durable and reliable construction.

An even further object of the present invention is to provide a new electronic book which is susceptible of a low cost of manufacture with regard to both materials and labor, and which accordingly is then susceptible of low prices of sale to the consuming public, thereby making such electronic book economically available to the buying public.

Still yet another object of the present invention is to provide a new electronic book which provides in the apparatuses and methods of the prior art some of the advantages thereof, while simultaneously overcoming some of the disadvantages normally associated therewith.

Still another object of the present invention is to provide a new electronic book for providing coincident visual and audible reading of electronically stored literature.

Even still another object of the present invention is to provide a new electronic book that includes a plurality of PCMCIA cards each with read only memory having unique text permanently stored therein. Further provided is a portable unit comprising at least one speaker for allowing the transmission of audio signals upon the receipt thereof, a PCMCIA interface slot formed in the housing for allowing the downloading of the text of the PCMCIA card, and a speech processor/synthesizer connected to the speaker for transmitting audio signals thereto upon the receipt of text stored in the PCMCIA card. Such audio signals are representative of speech corresponding with the text. Further provided is a control mechanism adapted to download the text located within the PCMCIA card via the PCMCIA interface and further transmit the same to the speakers and the display whereby the audio signals are continuously transmitted and a user may view the text via the display.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
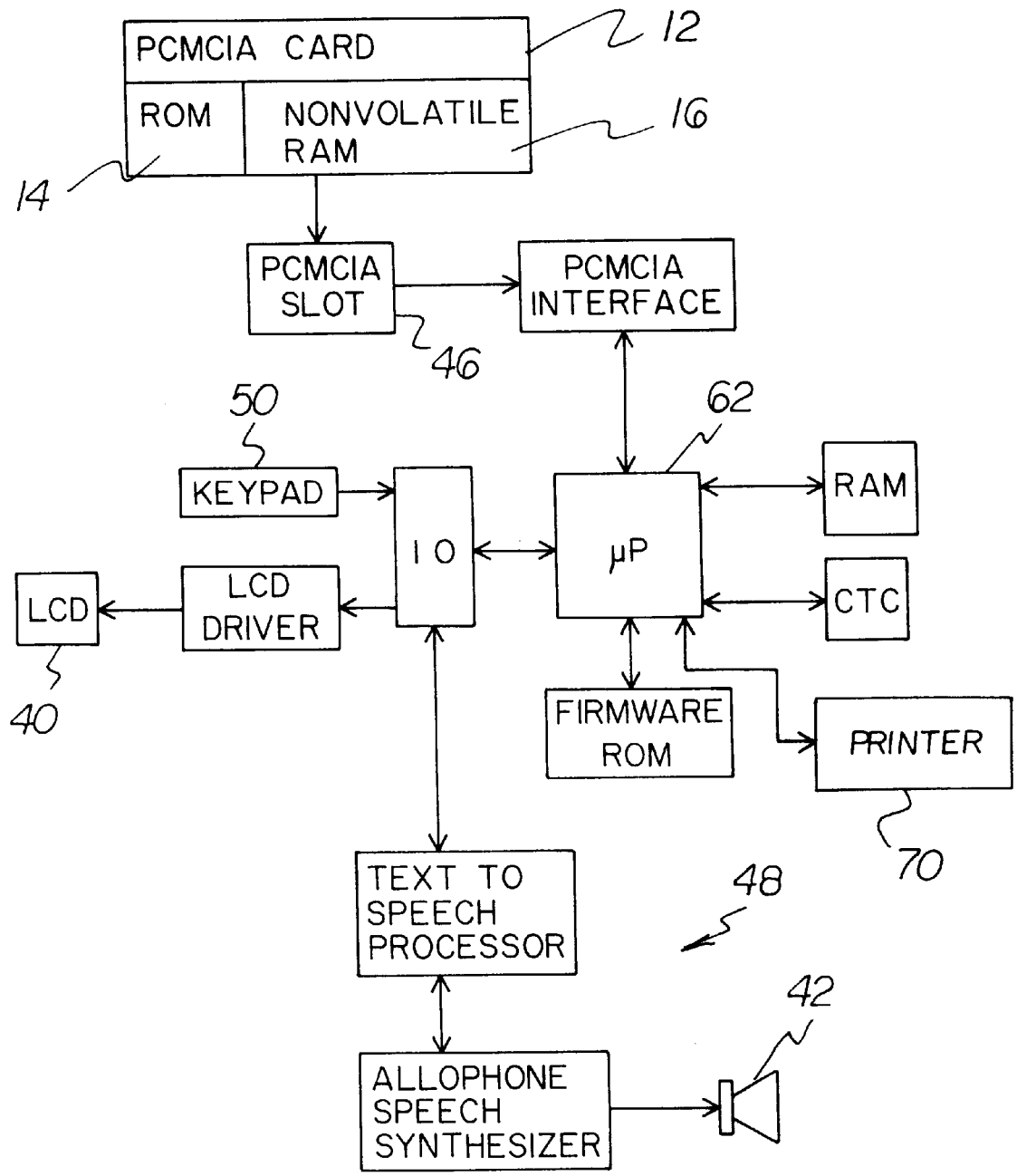
FIG. 1 is a schematic diagram of a new electronic book according to the present invention.

With reference now to the drawings, a new electronic book embodying the principles and concepts of the present invention and generally designated by the reference numeral 10 will be described.

Specifically, the system 10 of the present invention includes a plurality of PCMCIA cards 12. Each of such cards has read only memory 14 with unique text permanently stored therein. Such text preferably takes the form of literature. Further included is non-volatile flash random access memory 16 adapted to allow the temporary storage of a plurality of different flags located within the text stored in the read only memory. In the alternative, battery backed RAM may be utilized.

Figure 2:
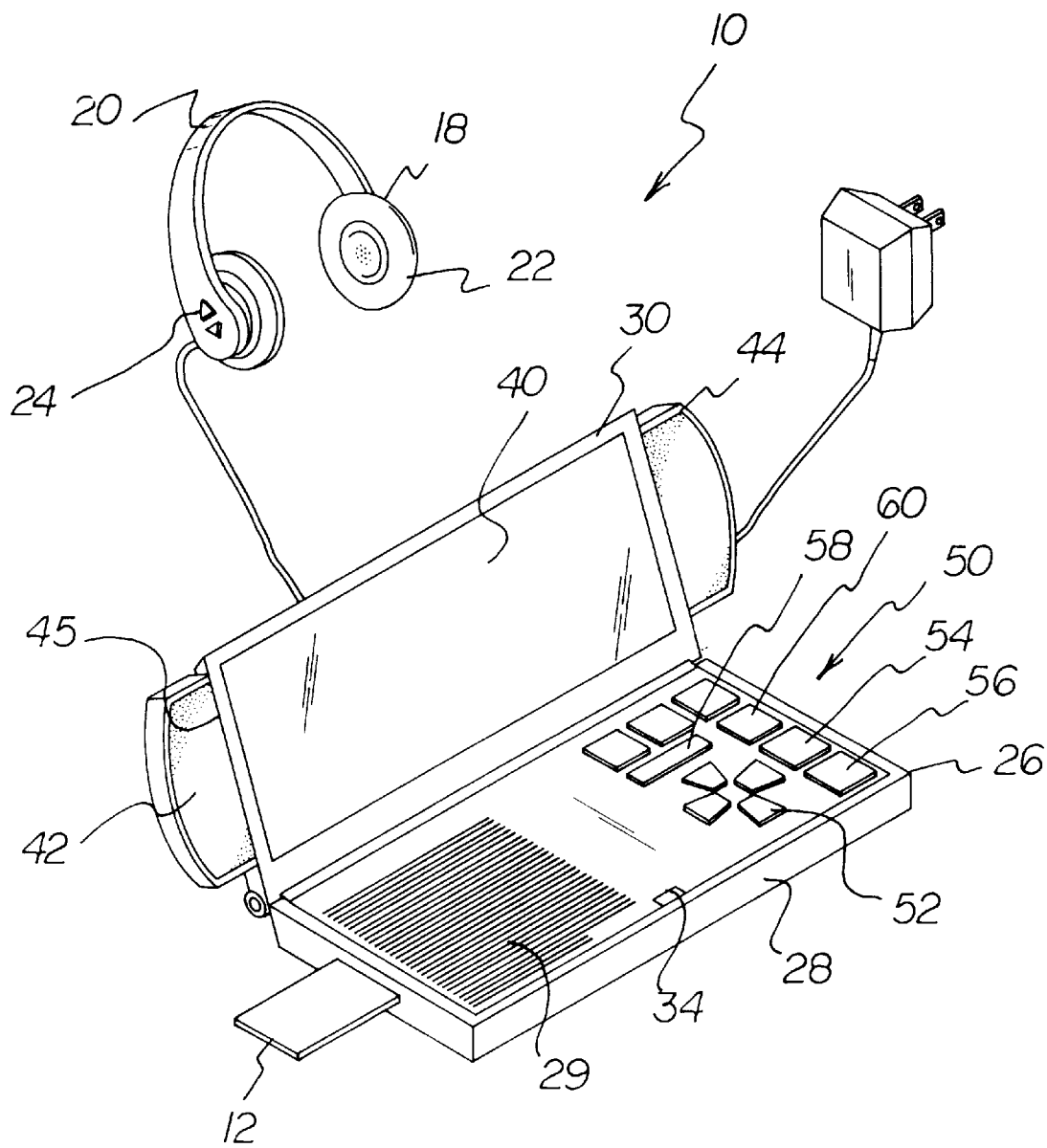
FIG. 2 is a schematic diagram of the present invention.

As shown in FIG. 2, a pair of headphones 18 is provided with an inverted U-shaped headset 20. Situated at ends of the U-shaped headset is a pair of ear portions 22 for transmitting audio signals therefrom upon the receipt thereof. As an option, the headphones have a volume toggle switch 24 positioned on one of the ear portions for controlling a volume of the audio signals transmitted therefrom.

Also included is a portable unit comprising a housing 26. The housing has a lower planar portion 28 with a rectangular configuration and a top face and a bottom face. Instructions 29 are preferably printed on the top face of the lower planar portion for facilitating the use of the present invention. The housing further includes an upper planar portion 30 with a rectangular configuration having a front face and a rear face. The upper planar portion is hingably coupled at an elongated edge thereof to a corresponding elongated edge of the lower planar portion. By such structure, the upper planar portion swivels between an open and closed orientation. In the preferred embodiment, the upper and lower portions together have a width of 4.5 inches, length of 8.5 inches, and a thickness of less than 1.5 inches.

For allowing the selective locking of the upper planar portion in the closed orientation thereof, a locking mechanism 34 is positioned on the top face of the lower planar portion. Such locking mechanism is similar in design to those employed in the laptop computer art.

Positioned on the front face of the upper planar portion of the housing is a liquid crystal display 40 for depicting text upon the receipt thereof.

A pair of speakers 42 are each positioned in an associated thin housing 44 which is slidably situated within an associated slot 45 formed in a short side edge of the upper planar portion of the housing. As an option, the speakers may be simply positioned on the top face of the lower planar portion of the housing. In use, the speakers are adapted for sliding between an extended and an inserted orientation. The speakers are further adapted for allowing the transmission of audio signals upon the receipt thereof. The pair of speaker further function to cease transmission of the audio signals and allow the transmission of the same to the ear portions of the headphones upon the coupling thereof to a jack on the housing.

Also provided is a PCMCIA interface slot 46 formed in a short side edge of the lower planar portion of the housing. The interface slot is adapted for allowing the downloading of the text and the different flags located within the text of the PCMCIA card.

A speech processor/synthesizer 48 is situated within an interior space of the lower planar portion of the housing. Preferably, the speech processor/synthesizer includes a CT256 chip available from General Instruments. The present component is connected to the speakers for transmitting audio signals thereto upon the receipt of text stored in the PCMCIA card. It should be noted that the audio signals are representative of speech directly corresponding with the words of the text.

A plurality of buttons 50 are situated on the top face of the lower planar portion of the housing. The buttons include four cursor buttons 52 and a page up button 54 and page down button 56 positioned to the side of the four cursor buttons. A goto button 58 is positioned directly above the four cursor buttons. Further provided is a bookmark button 60 positioned above the four cursor buttons.

Finally, control means 62 is connected to the PCMCIA interface, liquid crystal display, speech processor/synthesizer, and the buttons. To facilitate the operation of the control means, additional RAM and firmware ROM are connected thereto. Powering of the control means is preferably accomplished by way of an adapter and a battery backup.

In operation, the control means is adapted to download the text and the different flags located within the text of the PCMCIA card via the PCMCIA interface. After downloading, the text and the different flags are transmitted to the speech processor/synthesizer and the display, whereby the audio signals are continuously transmitted and a user is allowed to scroll freely through the text via the moving of a cursor by way of the scroll buttons, page up button, and page down button. In an alternate available mode, the text may be adapted to scroll automatically in coincident fashion with the corresponding audio signals.

To allow a user to select where the audio signals begin, the control means is further adapted to allow transmission of audio signals representative of text where the cursor currently resides. It should be noted that this is effected upon the depression of the goto button.

To resume reading and/or listening to a portion of the literature where one left off last, the control means also serves to automatically move the cursor to a location within the text dictated by one of the flags upon the depression of the bookmark button. Once the text appears on the display, the control means effects the transmission of audio signals representative of text where the cursor resides. When a user wishes to cease use of the present invention, the book mark may again be depressed to store a flag at a present location of the cursor.

In various alternate embodiments, a menu button may be employed to afford further features for facilitating the interaction of the audio signals and the text displayed. Examples of such features include a speed control means for controlling the speed at which the audio signals are transmitted. The control means may further be adapted to highlight or underline a word or phrase which is currently being articulated by the synthesizer. A pause and speaker deactivation button may also be included to temporarily pause the audio signals and mute the same, respectively.

Figure 3:
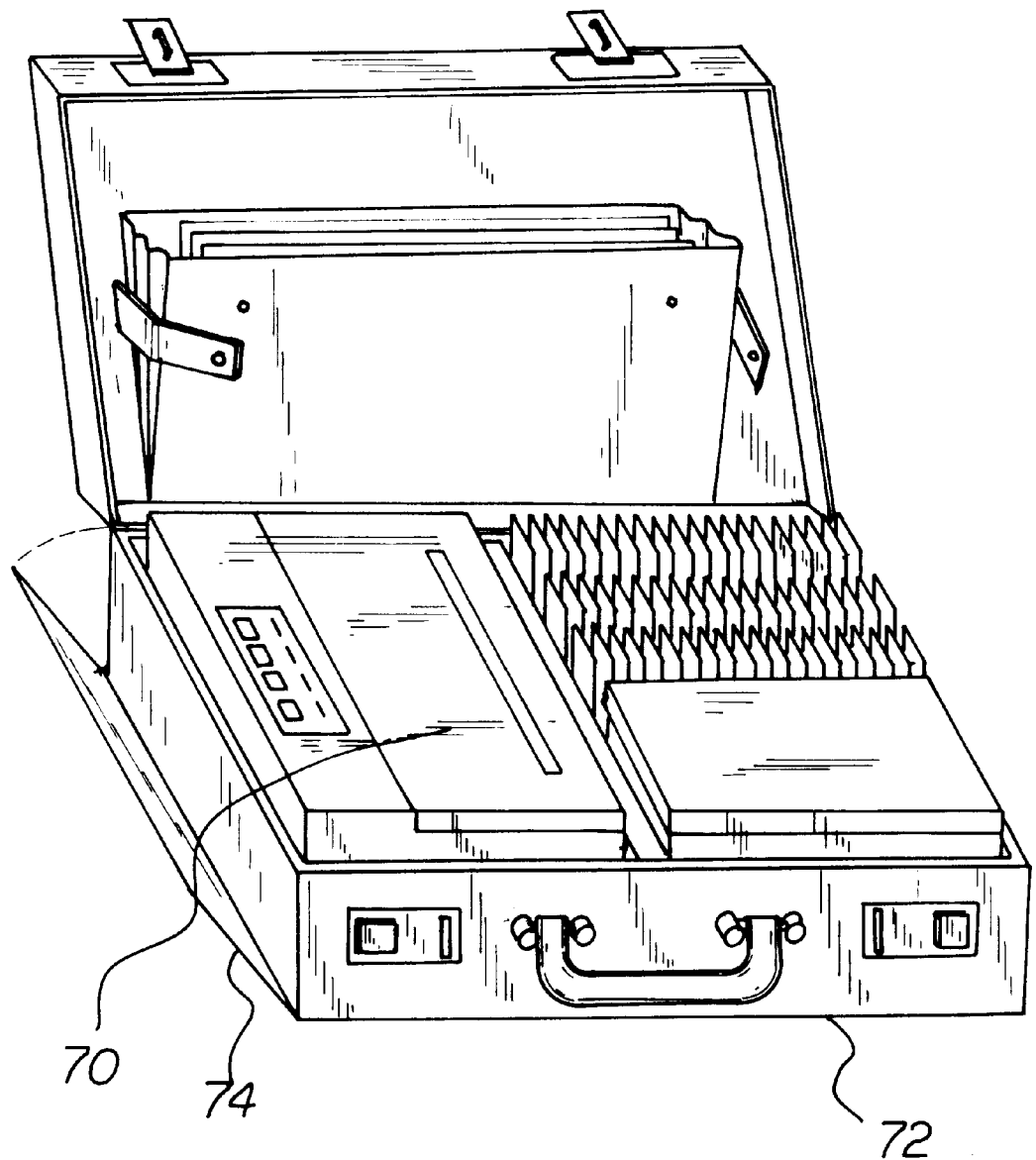
FIG. 3 is a schematic perspective view of a case of the invention.

A case 72 may be employed for holding a plurality of the PCMIA cards and other items such as a printer 70 (see FIG. 3). The case 72 may include an accordion folder 76.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An electronic book comprising, in combination:

a plurality of PCMCIA cards each including read only memory having unique text permanently stored therein and non-volatile random access memory adapted to allow the temporary storage of a plurality of different flags located within the text stored in the read only memory;

a pair of headphones having an inverted U-shaped headset with a pair of ear portions situated at ends thereof for transmitting audio signals therefrom upon the receipt thereof, the headphones having a volume toggle switch positioned on one of the ear portions for controlling a volume of the audio signals transmitted therefrom; and a portable unit comprising:

a housing including a lower planar portion with a rectangular configuration having a top face and a bottom face and an upper planar portion with a rectangular configuration having a front face and a rear face, the upper planar portion hingably coupled at an elongated edge thereof to a corresponding elongated edge of the lower planar portion thereby allowing the swiveling of the upper planar portion between an open and closed orientation, a locking mechanism positioned on the top face of the lower planar portion for allowing the selective locking of the upper planar portion in the closed orientation thereof, a liquid crystal display positioned on the front face of the upper planar portion of the housing for depicting text upon the receipt thereof, a pair of speakers slidably situated within slots formed in short side edges of the upper planar portion of the housing, the speakers adapted for sliding between an extended and an inserted orientation, the speakers further adapted for allowing the transmission of audio signals upon the receipt thereof, the pair of speaker functioning to cease transmission of the audio signals and allow the transmission of the same to the ear portions of the headphones upon the coupling thereof to the housing, a PCMCIA interface slot formed in a short side edge of the lower planar portion of the housing for allowing the downloading of the text and the different flags located within the text of the PCMCIA card, a speech processor/synthesizer situated within an interior space of the lower planar portion of the housing and connected to the speakers for transmitting audio signals thereto upon the receipt of text stored in the PCMCIA card, wherein the audio signals are representative of speech corresponding with the text, four cursor buttons positioned on the top face of the lower planar portion of the housing, a page up button and a page down button positioned to a side of the four cursor buttons, a goto button positioned directly above the four cursor buttons, a bookmark button positioned above the four cursor buttons, and control means connected to the PCMCIA interface, liquid crystal display, speech processor/synthesizer, and the buttons, the control means adapted to download the text and the different flags located within the text of the PCMCIA card via the PCMCIA interface and further transmit the same to the speakers and the display whereby the audio signals are continuously transmitted and a user is allowed to scroll freely through the text via moving of a cursor by way of the scroll buttons, page up button, and page down button, the control means further adapted to allow transmission of audio signals representative of text where the cursor currently resides upon the depression of the goto button, the control means also serving to automatically move the cursor to a location within the text dictated by one of the flags and allow transmission of audio signals representative of text where the cursor resides upon the depression of the bookmark button.

2. An electronic book comprising:

a plurality of PCMCIA cards each including read only memory having unique text permanently stored therein and non-volatile random access memory adapted to allow the temporary storage of a plurality of different flags located within the text stored in the read only memory; and a portable unit comprising:

a housing including a lower portion having a top face and a bottom face and an upper portion having a front face and a rear face, the upper portion hingably coupled to the lower portion thereby allowing the swiveling of the upper portion between an open and closed orientation, a liquid crystal display positioned on the upper portion of the housing for depicting text upon the receipt thereof, at least one speaker for allowing the transmission of audio signals upon the receipt thereof, a PCMCIA interface slot formed in the housing for allowing the downloading of the text of the PCMCIA card, a speech processor/synthesizer situated within an interior space of the lower portion of the housing and connected to the speaker for transmitting audio signals thereto upon the receipt of text stored in the PCMCIA card, wherein the audio signals are representative of speech corresponding with the text, and control means connected to the PCMCIA card interface, liquid crystal display, and speech processor/synthesizer, the control means adapted to download the text located within the PCMCIA card via the PCMCIA card interface and further transmit the same to the speaker and the display whereby the audio signals are continuously transmitted and a user may view the text via the display, wherein the control means further adapted to automatically move a cursor to a location within the text dictated by one of the flags and allow transmission of audio signals representative of text where the cursor resides upon the depression of a bookmark button which positioned on the top face of the lower portion of the housing.

3. An electronic book as set forth in claim 2 and further including a pair of headphones having an inverted U-shaped headset with a pair of ear portions situated at ends thereof for transmitting audio signals therefrom upon the receipt thereof, whereby the speaker functions to cease transmission of the audio signals and allow the transmission of the same to the ear portions of the headphones upon the coupling thereof to the housing.

4. An electronic book as set forth in claim 2 wherein a locking mechanism is positioned on the top face of the lower portion of the housing for allowing the selective locking of the upper portion of the housing in the closed orientation thereof.

5. An electronic book as set forth in claim 2 and further including four cursor button, a page up button and a page down button positioned on the top face of the lower portion of the housing, whereby the control means allows a user to scroll freely throughout the text by the moving of a cursor by way of the scroll buttons, page up button, and page down button.

6. An electronic book as set forth in claim 5 and further including a goto button, whereby the control means is further adapted to allow transmission of audio signals representative of text where the cursor currently resides upon the depression of the goto button.

\* \* \* \* \*